(12) United States Patent
Gateau et al.

(10) Patent No.: US 10,574,130 B2
(45) Date of Patent: Feb. 25, 2020

(54) ELECTRIC POWER CONVERTER (71) Applicant: Nidec ASI S.p.A., Milan (IT)

(72) Inventors: Guillaume Gateau, Toulouse (FR);
Thierry Meynard, Toulouse (FR);
Gianluca Postiglione, Genoa (IT);
Giovanni Borghetti, Genoa (IT);
Daniele Falchi, Milan (IT)

(73) Assignee: NIDEC ASI S.P.A., Milan (IT)

(*) Notice: Subject to any disclaimer, the term of this patent is extended or adjusted under 35 U.S.C. 154(b) by 0 days.

(21) Appl. No.: 16/420,128

(22) Filed: May 22, 2019

(65) Prior Publication Data
US 2019/0363627 A1 Nov. 28, 2019

(30) Foreign Application Priority Data

May 23, 2018 (EP) .................................. 18173847

(51) Int. Cl.
*H02M 1/12* (2006.01)
*H02M 7/797* (2006.01)
*H02M 1/00* (2006.01)

(52) U.S. Cl.
CPC ............ *H02M 1/12* (2013.01); *H02M 7/797* (2013.01); *H02M 2001/0048* (2013.01)

(58) Field of Classification Search
CPC . H02M 2007/4835; H02M 2001/0048; H02M 2001/007; H02M 1/10; H02M 1/12;
(Continued)

(56) References Cited

U.S. PATENT DOCUMENTS

| 4,175,249 A * | 11/1979 | Gruber | G05F 1/67 |
| | | | 136/293 |
| 4,742,535 A * | 5/1988 | Hino | H05G 1/46 |
| | | | 323/222 |

(Continued)

FOREIGN PATENT DOCUMENTS

| EP | 2525484 A1 | 11/2012 |
| EP | 2846453 A1 | 3/2015 |

(Continued)

OTHER PUBLICATIONS

Extended European Search Report in EP Application No. 18173847.7, dated Dec. 21, 2018, 5pp.

(Continued)

*Primary Examiner* — Adolf D Berhane
*Assistant Examiner* — Nusrat Quddus
(74) *Attorney, Agent, or Firm* — Hauptman Ham, LLP (57) ABSTRACT

An electric power converter includes a plurality of branches of switch units. A first stage, a second stage and a third stage of the converter are connected in series. The first stage includes first positive and negative branches, which are connected between a first output node and two first input nodes. The second stage includes three input nodes and positive and negative cells, each connected between a first input node and two second input nodes. The third stage includes third positive intermediate and negative branches, connected between the three second input nodes and three third input nodes. Capacitors are connected between the three second input nodes and between the three third input nodes.

16 Claims, 5 Drawing Sheets (58) Field of Classification Search
CPC .... H02M 1/126; H02M 3/06; H02M 3/33507;
H02M 3/335; H02M 5/40; H02M 5/458;
H02M 7/00; H02M 7/07; H02M 7/42;
H02M 7/44; H02M 7/48; H02M 7/4822;
H02M 7/483; H02M 7/487; H02M 7/49;
H02M 7/493; H02M 7/521; H02M 7/53;
H02M 7/537; H02M 7/538; H02M
7/5387; H02M 7/53862; H02M 7/53871;
H02M 7/53876; H02M 7/797; H02J
3/382; H02J 3/383; H02J 3/386; G05F
1/67; Y02E 10/723; Y02E 10/76; Y02E
10/763
See application file for complete search history.

(56) References Cited

U.S. PATENT DOCUMENTS

| | | | | |
|---|---|---|---|---|
| 5,119,283 | A * | 6/1992 | Steigerwald | H02M 1/10 323/207 |
| 5,726,870 | A * | 3/1998 | Lavieville | H02M 7/483 363/62 |
| 6,519,169 | B1 * | 2/2003 | Asplund | H02M 7/48 363/132 |
| 6,697,271 | B2 * | 2/2004 | Corzine | H02M 7/487 363/41 |
| 6,958,924 | B2 | 10/2005 | Gateau et al. | |
| 7,292,460 | B2 | 11/2007 | Barbosa et al. | |
| 7,313,008 | B2 | 12/2007 | Steimer | |
| 8,614,904 | B2 * | 12/2013 | Norrga | H02M 7/483 363/127 |
| 8,619,446 | B2 * | 12/2013 | Liu | H02M 1/12 363/71 |
| 9,071,165 | B2 * | 6/2015 | Soua | H02M 7/487 |
| 9,214,878 | B2 * | 12/2015 | Takizawa | H02M 7/487 |
| 9,252,670 | B2 * | 2/2016 | Schroeder | H02M 3/33507 |
| 9,553,516 | B2 * | 1/2017 | Lavieville | H02M 3/158 |
| 9,559,523 | B2 * | 1/2017 | Zabaleta Maeztu | H02M 7/483 |
| 9,673,431 | B2 * | 6/2017 | Despesse | H01M 2/1072 |
| 9,735,664 | B2 * | 8/2017 | Lavieville | H02M 7/487 |
| 9,748,862 | B2 * | 8/2017 | Cheng | H02M 7/487 |
| 9,762,136 | B2 * | 9/2017 | Barupati | H02M 7/487 |
| 9,812,990 | B1 * | 11/2017 | Cheng | H02P 27/14 |
| 9,923,369 | B2 * | 3/2018 | Hasegawa | H02M 7/487 |
| 2004/0257843 | A1 * | 12/2004 | Meynard | H02M 7/487 363/124 |
| 2006/0152085 | A1 * | 7/2006 | Flett | B60L 9/30 307/75 |
| 2008/0315859 | A1 | 12/2008 | Ponnaluri et al. | |
| 2013/0044526 | A1 | 2/2013 | Soua | |
| 2015/0295515 | A1 | 10/2015 | Zabaleta Maeztu et al. | |
| 2015/0311776 | A1 | 10/2015 | Lavieville | |
| 2016/0268924 | A1 * | 9/2016 | Fu | H02M 7/483 |

FOREIGN PATENT DOCUMENTS

| | | |
|---|---|---|
| FR | 3001592 A1 | 8/2014 |
| WO | 2007/087732 A1 | 8/2007 |

OTHER PUBLICATIONS

T. Bruckner et al., "Loss Balancing in Three-Level Voltage Source Inverters applying Active NPC Switches", Jun. 2001, pp. 1135-1140, 6pp.

Wang et al., "A Survey on Topologies of Multilevel Converters and Study of Two Novel Topologies", 2009, pp. 860-865, 6pp.

Gurpinar et al., "Novel Multilevel Hybrid Inverter Topology with Power Scalability", pp. 6516-6521, 6pp.

* cited by examiner

ELECTRIC POWER CONVERTER

RELATED APPLICATIONS

The present application claims priority to European Patent Application No. 18173847.7 filed May 23, 2018, the disclosure of which is hereby incorporated by reference herein in its entirety.

FIELD OF THE INVENTION

The present invention relates to an electric power converter, which is adapted to be connected between a DC voltage source and an AC voltage source and to provide a plurality of voltage levels at the AC side.

BACKGROUND OF THE INVENTION

Reversible electric power converters are usually connected between a DC positive terminal, a DC negative terminal, and a plurality of AC terminals, for example three AC terminals. The voltage at each AC terminal is controlled through a respective phase portion of the converter, which is structurally identical to and independent from the other phase portions. For simplicity, the known converters and the converters of the invention will be described with reference to one AC terminal.

The converters provide an output voltage at the AC terminal which is not sinusoidal, since it varies according to a limited number of voltage levels. This generates high frequency harmonic components which are detrimental to the quality of the AC voltage, and which usually requires appropriate harmonic filters.

The voltage levels which are outputted at the AC terminal are in general those of the DC positive and negative terminals, and optionally a number of intermediate voltages, for example the average voltage between the DC positive and negative terminals.

The high frequency components can be reduced by increasing the number of voltage levels outputted by the converter. In this way the quality of the AC voltage is improved, and the cost of the filters may be reduced.

The paper "Loss balancing in three-level voltage source inverters applying active NPC switches" (T. Bruckner, S. Bernet, 17-21 Jun. 2001) discloses an active neutral point clamped converter (ANPC converter). In the ANPC converters, positive and negative capacitors are connected in series between the terminals of a DC source, and they provide a neutral point therebetween.

A positive cell and a negative cell are connected to the positive and negative capacitors, and a selector is connected downstream the positive and the negative cells. An ANPC converter outputs three voltage levels, i.e. the voltages of the DC positive and negative terminals and of the neutral point.

U.S. Pat. No. 7,292,460 discloses an improvement to the ANPC converters, where the positive cell, the negative cell and the selector may comprise many capacitors and couples of switch units. The switch units comprise each a controllable switch with an antiparallel diode. With an appropriate control, the voltage of the capacitors may be added to, or subtracted from, the typical output voltages of an ANPC converter. The number of output voltage levels is thereby increased.

U.S. Pat. No. 6,958,924 discloses a stacked multicell converter (SMC converter), where several stages of switching cells are connected between a DC source and an AC source. In each cell two switch units are provided, which are controlled to be always in opposite states.

The stages define two end groups of switch units and at least one intermediate group of switch units which are common to adjacent stages. Capacitors are connected in parallel to the switching cells of the stages, and they have voltages increasing from the AC source to the DC source. All the stages are short-circuited at the AC terminal.

U.S. Pat. No. 7,313,008 discloses a converter having two end switching groups composed by diodes and an intermediate switching group comprising two controllable switches. Capacitors connect the switching groups at the DC side, while at least the end switching groups are short-circuited at the AC terminal.

SUMMARY OF THE INVENTION

An object of the present invention is to provide a flexible and reliable multilevel converter.

Another object of the invention is to reduce the power losses associated to the power conversion.

These and other objects are achieved with an electric power converter according to any of the appended claims.

BRIEF DESCRIPTION OF THE DRAWINGS

More features and advantages of the converter according to the present invention will result from the following detailed description of a preferred embodiment of the present invention, which is illustrated as a non-limiting example in the appended drawings, wherein.

DETAILED DESCRIPTION

With reference to the accompanying figures, an electric power converter is indicated globally with reference number 1. The converter 1 comprises a plurality of branches 21, 22, 33, 34, 35, 36, 41, 42, 43. The branch 41 will be now described as an example for all the branches, while the connection of the branches is described below.

The branch 41 comprises one or more series connected switch units 414, 415, and in some of the embodiments also 416, 417. Each switch unit, for example the switch unit 414, comprises a controllable switch 414a and a diode 414b connected in antiparallel to the controllable switch 414a.

In this description the connection in antiparallel refers to the direction of the currents flowing in the diode 414b and in the controllable switch 414a. In particular, a current flowing in the switch unit 414 in a first direction will flow though the controllable switch 414a, provided that the controllable switch 414a is in an on state. Instead, if the controllable switch 414b is in an off state, the switch unit 414 is configured to stop a current in the first direction. Moreover, a current flowing in the switch unit 414 in a second direction opposite to the first direction will flow through the diode 414b.

Optionally, the branch 41 is subdivided in switching groups 411, 412, i.e. the branch 41 comprises a plurality of switching groups 411, 412. Each switching group 411, 412 comprises in turn one or more switch units, such as the switch units 414, 415 in the switching group 411, and the switch units 416, 417 in the switching group 412. However, as it will be evident from the whole description and from the figures, the branches may also consist of only one switch unit, which coincides with one switching group.

The converter 1 comprises a first stage 2, a second stage 3 and a third stage 4. The stages 2, 3, 4 are connected in series, and in particular the second stage 3 connects the first stage 2 and the third stage 4. Each stage 2, 3, 4 comprises a number of branches, input nodes and output nodes, and optionally capacitors and other nodes. The branches, the nodes and the capacitors will be named in general as first, second or third depending on the name of their stage 2, 3, 4. However, this will not apply to the switch units of a specific branch.

During use of the converter 1 a phase of an AC network, such as an AC load or power source, may be connected to a first output node 23 of the first stage 2. Moreover, a DC network, such as a DC load or power source, may be connected to a third positive input node 44 and to a third negative input node 46 of the third stage 4. However, other electric components may be connected to the mentioned nodes, between the converter 1 and any external network.

Since the stages 2, 3, 4 are connected in series, the input nodes 24, 25 of the first stage 2 are connected to, or in other words coincident with, the output nodes of the second stage 3 (the same reference number is used for them in the figures). Similarly, the input nodes 37, 38, 39 of the second stage 3 are connected to or coincident with the output nodes of the third stage 4.

When the converter 1 is connected to the mentioned AC and DC networks and the converter 1 is controlled as an inverter, electric power flows through each stage 2, 3, 4 from the relative input nodes to the output nodes, on average. However, the terms input and output are intended just to designate some specific elements of the stages 2, 3, 4, and not to limit the scope of the claims to a specific use of the converter 1. In fact, the converter 1 is in general a reversible converter, and it may be used also as a rectifier with electric power flowing on average from the output nodes to the input nodes of each stage 2, 3, 4.

The first stage 2 comprises a first positive branch 21 and a first negative branch 22. The first positive branch 21 is connected between the first output node 23 and a first positive input node 24, while the first negative branch 22 is connected between the first output node 23 and a first negative input node 25.

The second stage 3 comprises a positive cell 31 and a negative cell 32. The positive cell 31 is connected to a second positive input node 37, a second intermediate input node 38, and the first positive input node 24, which constitutes also a second positive output node. Moreover, the negative cell 32 is connected to the second intermediate input node 38, a second negative input node 39, and the first negative input node 25, which constitutes a second negative output node. It shall be noted that the positive cell 31 and the negative cell 32 are both connected at the second intermediate input node 38.

More in detail, the positive cell 31 comprises a second positive end branch 33 and a second positive intermediate branch 34. The second positive end branch 33 is connected between the first positive input node 24 and the second positive input node 37, and the second positive intermediate branch 34 is connected between the first positive input node 24 and the second intermediate input node 38.

Similarly, the negative cell 32 comprises a second negative intermediate branch 35 and a second negative end branch 36. The second negative intermediate branch 35 is connected between the first negative input node 25 and the second intermediate input node 38, and the second negative end branch 36 is connected between the first negative input node 25 and the second negative input node 39.

The second stage 3 further comprises a second positive capacitor 51 and a second negative capacitor 52. The second positive capacitor 51 is connected between the second positive input node 37 and the second intermediate input node 38, and the second negative capacitor 52 is connected between the second intermediate input node 38 and the second negative input node 39. Though the second positive and negative capacitors 51, 52 are described as a part of the second stage 3 for simplicity, they can be considered indifferently also part of the third stage 4.

The third stage 4 comprises a third positive branch 41, a third intermediate branch 42 and a third negative branch 43. The third positive branch 41 is connected between the second positive input node 37, which can be also considered as a third positive output node, and the third positive input node 44. The third intermediate branch 42 is connected between the second intermediate input node 38, i.e. a third intermediate output node, and a third intermediate input node 45. The third intermediate input node 45 can be grounded as shown in the figures, or not grounded. The third negative branch 43 is connected between the second negative input node 39, i.e. a third negative output node, and the third negative input node 46.

The third stage 4 further comprises a third positive capacitor 53 and a third negative capacitor 54. The third positive capacitor 53 is connected between the third positive input node 44 and the third intermediate input node 45, and the third negative capacitor 54 is connected between the third intermediate input node 45 and the third negative input node 46. Though the third positive and negative capacitors 53, 54 are described as part of the third stage 4 for simplicity, they may be also pre-existing capacitors of a DC network, and they may also be common to different phase portions of the converter.

Figure 1:
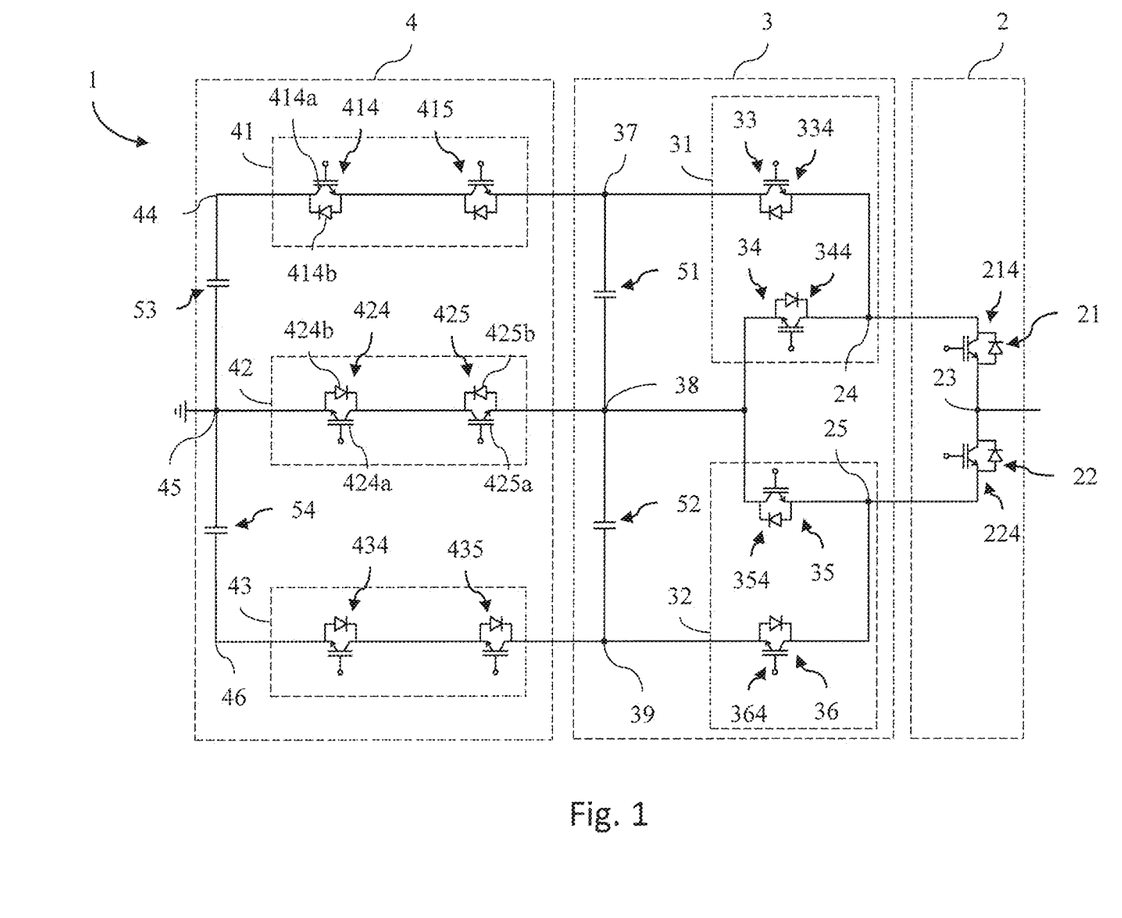
FIG. 1 shows a scheme of a converter according to a first embodiment of the invention.
Figure 2:
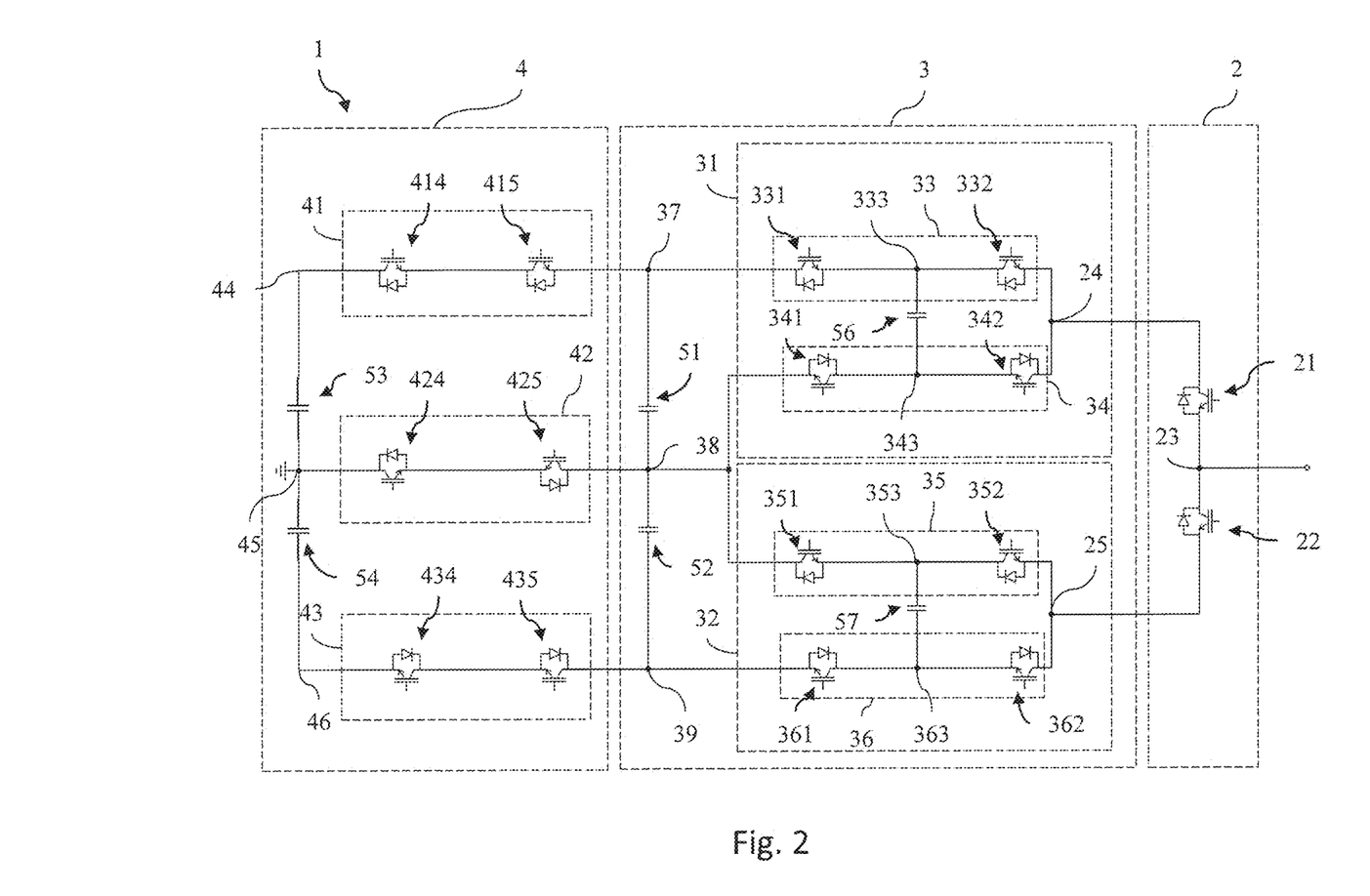
FIG. 2 shows a scheme of a converter according to a second embodiment of the invention.
Figure 3:
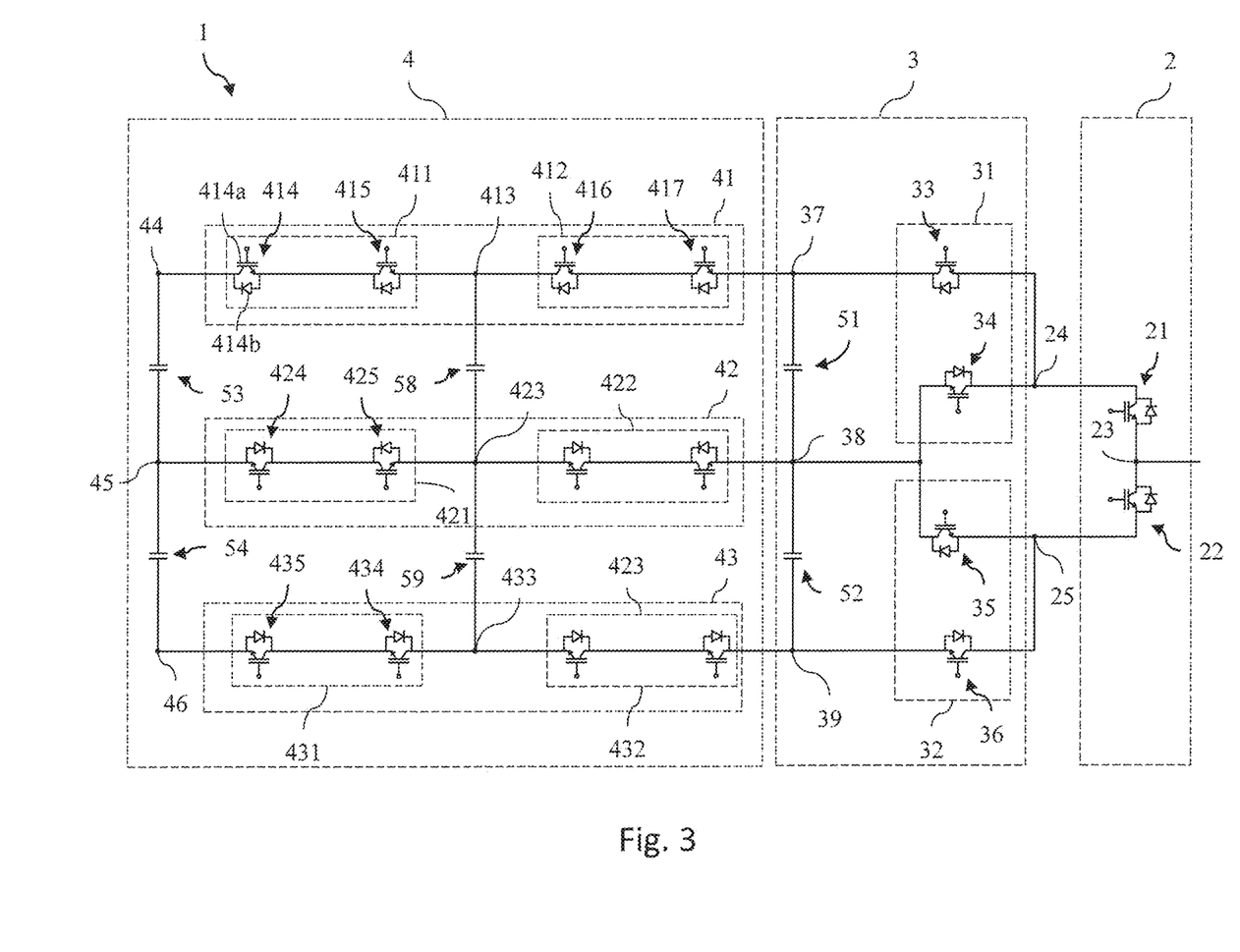
FIG. 3 shows a scheme of a converter according to a third embodiment of the invention.

In the embodiments of FIGS. 1, 2 and 3 the first positive and negative branches 21, 22 consist each of only one switch unit.

Figure 4:
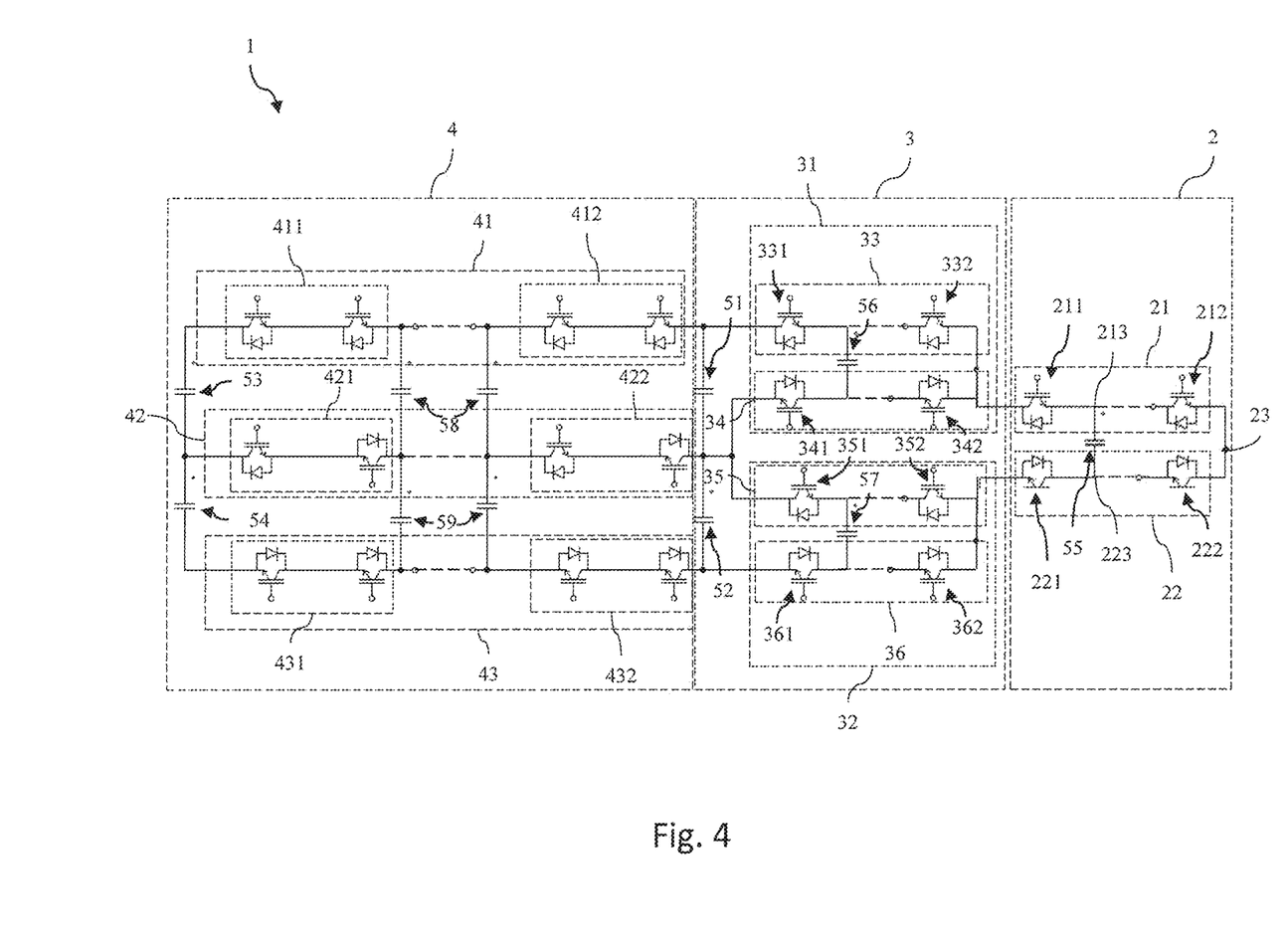
FIG. 4 shows a scheme of a converter according to a fourth, more general embodiment of the invention.
Figure 5:
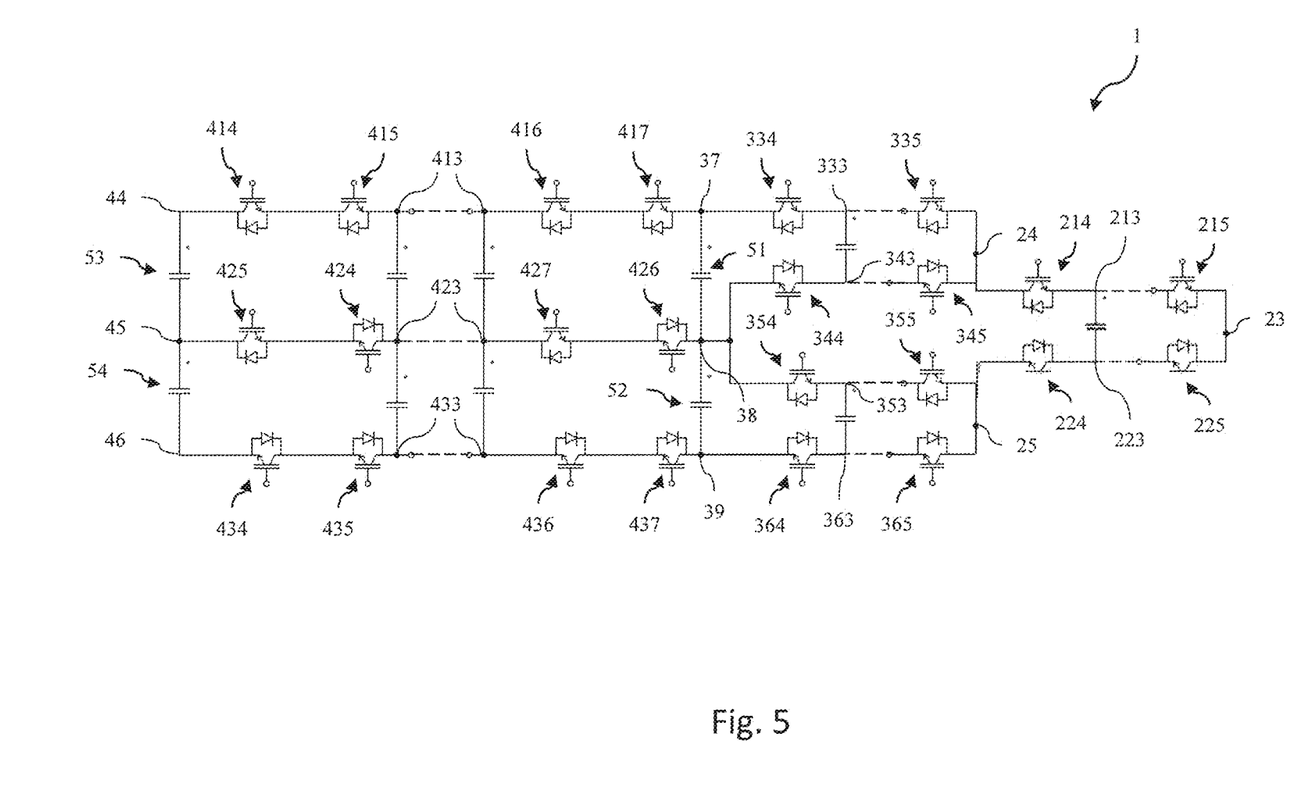
FIG. 5 shows the converter of FIG. 4, where other details are highlighted.

However, in the general embodiment of FIGS. 4 and 5 the first positive and negative branches 21, 22 comprise each a plurality of switching groups 211, 212, 221, 222. These switching groups 211, 212, 221, 222 are mutually connected in series in each respective branch 21, 22 at one or more first connecting nodes 213, 223. The number of switching groups 211, 212 of the first positive branch 21 and the number of switching groups 221, 222 of the first negative branch 22 are the same. Each of said switching groups 211, 212, 221, 222 comprises a respective switch unit, which are in the order 214, 215, 224, 225.

In this embodiment, the first stage 2 further comprises one or more first connecting capacitors 55. The number of first connecting capacitors 55 is equal to the number of switching groups 211, 212, of the first positive branch 21 (which is also the number of switch units 221, 222 of the first negative branch 22) reduced by one. Each first connecting capacitor 55 is connected between a respective first connecting node 213 of the first positive branch 21 and a respective first connecting node 223 of the first negative branch 22.

In the embodiments of FIGS. 1 and 3 the second positive and negative end branches 33, 36 and the second positive and negative intermediate branches 34, 35 consist each of only one switch unit.

However, in the embodiment of FIG. 2 and in the general embodiment of FIGS. 4 and 5, the second positive and negative end branches 33, 36 and the second positive and negative intermediate branches 34, 35 comprise each a plurality of switching groups 331, 332, 341, 342, 351, 352, 361, 362. Said switching groups 331, 332, 341, 342, 351, 352, 361, 362 are mutually connected in series in each respective branch 33, 34, 35, 36 at one or more second connecting nodes 333, 343, 353, 363. Each of said switching groups 331, 332, 341, 342, 351, 352, 361, 362 comprises a respective switch unit, which are in the order 334, 335, 344, 345, 354, 355, 364, 365.

The number of switching groups 331, 332 of the second positive end branch 33, the number of switching groups 341, 342 of the second positive intermediate branch 34, the number of switching groups 351, 352 of the second negative intermediate branch 35 and the number of switching groups 361, 362 of the second negative end branch 36 are the same.

In these embodiments, the second stage 3 further comprises one or more second positive connecting capacitors 56 and one or more second negative connecting capacitors 57, in the same number as the first positive connecting capacitors 56. The number of second positive connecting capacitors 56 is equal to the number of switching groups 331, 332 of the second positive end branch 33, reduced by one. In the embodiment of FIG. 2 one second positive connecting capacitor 56 is provided.

Each second positive connecting capacitor 56 is connected between a respective second connecting node 333 of the second positive end branch 33 and a second connecting node 343 of the second positive intermediate branch 34. Moreover, each second negative connecting capacitor 57 is connected between a respective second connecting node 353 of the second negative intermediate branch 35 and a second connecting node 363 of the second negative end branch 36.

In the embodiments of FIGS. 1 and 2, the third positive, intermediate and negative branches 41, 42, 43 comprise each two switch units 414, 415, 424, 425, 434, 435.

In detail, the third intermediate branch 42 comprises a first switch unit 424 adapted to stop a current flowing in a first direction and a second switch unit 425 adapted to stop a current flowing in a second direction opposite to the first direction. The first and second switch units 424, 425 of the third intermediate branch 42 can be considered as a single switching group 421.

The first and second switch units 424, 425 of the third intermediate branch 42 may be connected for example in antiseries. This means that a current may flow simultaneously through the controllable switch 424a of the first switch unit 424 and through the diode 425b of the second switch unit 425. Moreover, another current may flow simultaneously through the diode 424b of the first switch unit 424 and through the controllable switch 425a of the second switch unit 425.

Preferably, the third intermediate branch 42 is the only branch where the switch units are connected in antiseries. In general, in any other branch comprising more than one switch unit, the series connection of the switch units is preferably a connection where the switch units have all the same orientation. In other words, a current flowing in a direction may pass through the diodes of all the switch units, and a current in an opposite direction may pass through the controllable switches of all the switch units, provided that they are in an on state.

In the embodiments of FIGS. 1 and 2 the third positive and negative branches 41, 43 comprise each two switch units, and in particular a first switch unit 414, 434 and a second switch unit 415, 435. The first and second switch units 414, 415 of the third positive branch 41 can be considered as a single switching group 411 of the third positive branch 41, and the first and second switch units 434, 435 of the third negative branch 43 can be considered as a single switching group 431 of the third negative branch 43.

Advantageously, the blocking voltages of the switching groups 411, 431 of the third positive and negative branches 41, 43 is given by the sum of the blocking voltages of the respective first and second switch units 414, 415, 434, 435. Moreover, the first and second switch units 414, 415, 424, 425, 434, 435 of the third positive, negative and intermediate branches 41, 42, 43 may have all the same blocking voltage. This blocking voltage may be the same also for all the switch units of the first and/or second stage 2, 3.

However, in an embodiment which is not shown in the figures, the third positive and negative branches 41, 43 may consist each of only one switch unit. This arrangement will be in general more expensive since the switch units of the third positive and negative branches 41, 43 will require a higher blocking voltage.

The blocking voltage is the maximum voltage that a switch is supposed to withstand under steady state conditions in a specific control state and in a specific direction.

In the embodiment of FIG. 3 and in the general embodiment of FIGS. 4 and 5, the third positive, intermediate and negative branches 41, 42, 43 comprise each a plurality of switching groups 411, 412, 421, 422, 431, 432. Said switching groups 411, 412, 421, 422, 431, 432 are mutually connected in series in each respective branch 41, 42, 43 at one or more third connecting nodes 413, 423, 433.

The number of switching groups 411, 412 of the third positive branch 41, the number of switching groups 421, 422 of the third intermediate branch 42 and the number of switching groups 431, 432 of the third negative branch 43 are the same.

Each switching group 411, 412, 421, 422, 431, 432 of the third positive, intermediate and negative branches 41, 42, 43 in these embodiments may have the same features as described with reference to the embodiments of FIGS. 1 and 2 for the corresponding switching groups. For example, an additional third positive switching group 412 comprises a first switch unit 416 and a second switch unit 417, an additional third intermediate switching group 422 comprises a first switch unit 426 and a second switch unit 427, and an additional third negative switching group 432 comprises a first switch unit 436 and a second switch unit 437.

In the embodiment of FIG. 3 and in the general embodiment of FIGS. 4 and 5, the third stage 4 further comprises one or more third positive connecting capacitors 58 and one or more third negative connecting capacitors 59, in the same number as the third positive connecting capacitors 58. The number of third positive connecting capacitors 58 is equal to the number of switching groups 411, 412 of the third positive branch 41, reduced by one. In the embodiment of FIG. 3 one third positive connecting capacitor 58 is provided.

Each third positive connecting capacitor 58 is connected between a respective third connecting node 413 of the third positive branch 41 and a third connecting node 423 of the third intermediate branch 42. Moreover, each third negative connecting capacitor 59 is connected between a respective third connecting node 423 of the third intermediate branch 42 and a third connecting node 433 of the third negative branch 43.

All the capacitors of the converter 1 are preferably charged according to the criterion that the voltage of the capacitors is higher for capacitors closer to the DC side, i.e. to the third input node 44, 45, 46, and the voltage of the capacitors is lower for capacitors closer to the AC side, i.e. to the first output node 23.

In fact, the third positive and negative capacitors 53, 54 are charged to a first voltage, and the second positive and negative capacitors 51, 52 are charged to a second voltage which is a fraction of the first voltage. In this description, the term fraction designates a proper fraction, i.e. a fraction lower than one.

More in detail, the capacitor closest to the first output node 23 is charged to a minimum voltage, and the other capacitors are charged to voltages which are multiples of the minimum voltage. The capacitor closest to the first output node 23 may be one of the first connecting capacitors 55, if any, or otherwise one of the second positive or negative connecting capacitors 56, 57, if any, or otherwise anyone of the second positive and negative capacitors 51, 52.

For example in the embodiment of FIG. 1, when the voltage difference between the third positive and negative input nodes 44, 46 is called $V_{DC}$, the second positive and negative capacitors 51, 52 are charged to a voltage of approximately $V_{DC}/4$. Moreover, the third positive and negative capacitors 53, 54 are charged to a voltage of approximately $V_{DC}/2$. The converter 1 of this embodiment may output at the first output node 23 five voltage levels, which are 0, $\pm V_{DC}/4$ and $\pm V_{DC}/2$.

In the embodiment of FIG. 2, the second positive and negative connecting capacitors 56, 57 are charged to a voltage of approximately $V_{DC}/6$, the second positive and negative capacitors 51, 52 are charged to a voltage of approximately $V_{DC}/3$, and the third positive and negative capacitors 53, 54 are charged to a voltage of approximately $V_{DC}/2$. The converter 1 of this embodiment may output at the first output node 23 seven voltage levels, which are 0, $\pm V_{DC}/6$, $\pm V_{DC}/3$ and $\pm V_{DC}/2$.

In the embodiment of FIG. 3 the second positive and negative capacitors 51, 52 are charged to a voltage of approximately $V_{DC}/6$, the third positive and negative connecting capacitors 58, 59 are charged to a voltage of approximately $V_{DC}/3$, and the third positive and negative capacitors 53, 54 are charged to a voltage of approximately $V_{DC}/2$. Even the converter 1 of this embodiment may output at the first output node 23 seven voltage levels, which are 0, $\pm V_{DC}/6$, $\pm V_{DC}/3$ and $\pm V_{DC}/2$.

In general, when a first connecting capacitor 55, a second positive connecting capacitor 56 or a third positive connecting capacitor 58 is added to the converter 1, the number of output levels may be increased by at least two levels.

The control of the converter will be now described. The converter 1 in fact comprises a controller, which is not shown in the figures. The converter 1 is controllable by the controller to provide an output voltage at the first output node 23, which output voltage has positive halfwaves and negative halfwaves alternating at a fundamental frequency.

During the positive halfwave the output voltage is equal to or higher than the voltage of the third intermediate input node 45, and during the negative halfwave the output voltage is equal to or lower than the voltage of the third intermediate input node 45.

The controller in particular is configured to provide control signals to the controllable switches of the converter in order to alternate on states and off states. In the on state a switch unit conducts current in both directions, and its controllable switch conducts current in one direction. In the off state the switch units conduct current in only one direction, and their controllable switches does not conduct current in any direction.

In the converter 1 some couples of switch units are controlled to be always in opposite states. However, as it is known to the skilled persons, even if a couple of switch units will be in opposite states for substantially all the time, when a switch unit is switched off the other switch unit of the couple may be switched on only after a small delay time. This ensures to avoid short-circuiting some components of the converter 1, especially the capacitors.

In detail, the controller is configured to control a switch unit 214 of the first positive branch 21 and a switch unit 224 of the first negative branch 22 to be always in opposite states.

Moreover, the controller is preferably configured to keep said switch unit 214 of the first positive branch 21 in an on state during the positive halfwave, and to keep said switch unit 224 of the first negative branch 22 in an on state during the negative halfwave.

This happens to at least one switch unit 214 of the first positive branch 21, and to at least one switch unit 224 of the first negative branch 22. In some embodiments, this corresponds to the whole first positive and negative branches 21, 22.

Therefore, these switch units 214, 224 of the first stage 2 switch at the fundamental frequency, and in detail they switch one time from the on state to the off state and one time from the off state to the on state during a fundamental period which is equal to the reciprocal of the fundamental frequency.

As it will be explained below, many other switches of the converter 1 are switched at a switching frequency which is a multiple of the fundamental frequency. This means that they switch from the on state to the off state and from the off state to the on state a plurality of times during a fundamental period.

In order to reduce the power losses of the converter, it is preferred to switch at the fundamental frequency as much switch units as possible.

In order to explain the control of the switch units of the second and third stages 3, 4 in detail, reference will be made for simplicity to the embodiment of FIG. 1, where only one switching group is provided for each branch. When a branch comprises a plurality of switching groups, each switching group may be controlled independently, eventually with different control states among switching groups or among switch units of the same switching group. However, for the second and third stages 3, 4, all the switching groups of a branch are controlled according to the same overall logic, as it is now explained for the embodiment of FIG. 1.

The controller is configured to control a switch unit 334 of the second positive end branch 33 and a switch unit 344 of the second positive intermediate branch 34 to be always in opposite states, and to control a switch unit 354 of the second negative intermediate branch 35 and a switch unit 364 of the second negative end branch 36 to be always in opposite states.

Moreover, the controller is configured, during the positive halfwave, to keep said switch unit 354 of the second negative intermediate branch 35 in an on state and to switch said switch unit 344 of the second positive intermediate branch 34 at the switching frequency. Symmetrically, the controller is configured, during the negative halfwave, to keep said switch unit 344 of the second positive intermediate branch 34 in an on state and to switch said switch unit 354 of the second negative intermediate branch 35 at the switching frequency.

More in detail, during the positive halfwave the whole second negative intermediate branch 35 is kept in an on state and the whole second negative end branch 36 is kept in an off state. Symmetrically, during the negative halfwave the whole second positive intermediate branch 34 is kept in an on state and the whole second positive end branch 33 is kept in an off state.

Therefore, the positive cell 31 has low power losses during the negative halfwave, and the negative cell 32 has low power losses during the positive halfwave. This control also keeps relatively low the voltage difference which is applied to the switch units of the first stage 2 while they are in the off state. Accordingly, switch units with relatively low blocking voltages may be used.

Preferably the controller is configured, during the transition from the positive to the negative halfwaves, to keep in an on state the second positive intermediate branch 34 and the second negative intermediate branch 35, to switch the first negative branch 22 from an off state to an on state, and then to switch the first positive branch 21 from an on state to an off state. Moreover, the controller is configured, during the transition from the negative to the positive halfwaves, to keep in an on state the second positive intermediate branch 34 and the second negative intermediate branch 35, to switch the first positive branch 21 from an off state to an on state, and then to switch the first negative branch 22 from an on state to an off state.

Advantageously, during these transitions the first positive and negative branches 21, 22 may switch the current under a substantially null voltage since they are short-circuited by switch unit 344 of the second positive intermediate branch 34 and switch unit 354 of the second negative intermediate branch 35, which are both controlled to on states.

Passing to the third stage 4, the controller is configured to control the first switch unit 424 of the third intermediate branch 42 and the first switch unit 414 of the third positive branch 41 to be always in opposite states, and to control the second switch unit 425 of the third intermediate branch 42 and the first switch unit 434 of the third negative branch 43 to be always in opposite states.

More in detail the controller is configured, during the positive halfwave, to keep the second switch unit 425 of the third intermediate branch 42 in an on state and to switch the first switch unit 424 of the third intermediate branch 42 at a switching frequency which is a multiple of the fundamental frequency.

Similarly, the controller is configured, during the negative halfwave, to keep the first switch unit 424 of the third intermediate branch 42 in an on state and to switch the second switch unit 425 of the third intermediate branch 42 at the switching frequency.

According to a first possible control logic for the second switch units 415, 435 of the third positive and negative branches 41, the controller is configured to control the second switch units 415, 435 of the third positive and negative branches 41, 43 to be always in opposite states. In this case preferably the controller is configured to keep the second switch unit 415 of the third positive branch 41 in an on state during the positive halfwave, and to keep the second switch unit 435 of the third negative branch 43 in an on state during the negative halfwave.

This control logic is advantageous since the second switch units 415, 435 of the third positive and negative branches 41, 43 switch at the fundamental frequency during both the halfwaves, differently from the first switch units 414, 434 of the third positive and negative branches 41, 43, which switch at switching frequency for at least one halfwave.

According to a second possible control logic, the controller is configured to control the first and the second switch units 414, 415 of the third positive branch 41 to be always in the same state, and to control the first and the second switch units 434, 435 of the third negative branch 43 to be always in the same state.

A preferred control to keep the voltage of the capacitors substantially constant during the use of the converter 1 will be now described. The description will focus on the second positive and negative capacitors 51, 52. The third positive and negative capacitors 53, 54 instead do not need a specific control since their voltage may remain constant thanks to a DC source connected to the third positive and negative input nodes 44, 46, and optionally by grounding the third intermediate input node 45.

In case the converter 1 comprises additional capacitors, for example first connecting capacitors 55, or second or third positive or negative capacitors 56, 57, 58, 59, a similar control will be implemented.

The Applicant noted that the positive voltage levels which are lower than the voltage of the third positive input node 44 and the negative voltage levels which are higher than the voltage of the third negative input node 46 may be outputted at the first output node 23 with distinct current paths, which are therefore called redundant current paths. The current paths comprise switch units in the on state, and optionally capacitors.

For example, in the embodiment of FIG. 1 the voltage level $V_{DC}/4$ may be outputted with a first current path comprising the third positive branch 41, the second positive capacitor 51, the second positive intermediate branch 34 and the first positive branch 21. The second positive capacitor 51 is therefore charged or discharged depending if the current is flowing from the third stage 4 to the first stage 2 or from the first stage 2 to the third stage 4.

The voltage level $V_{DC}/4$ may be outputted also with a second current path comprising the third intermediate branch 42, the second positive capacitor 51, the second positive end branch 33 and the first positive branch 21. The second positive capacitor 51 is again charged or discharged depending on the direction of the current, but the charge or discharge with the second current path is inverted with respect to the first current path.

Therefore, when a first positive voltage level lower than the voltage of the third positive input node 44, such as $V_{DC}/4$ for the embodiment of FIG. 1, is required at the first output node 23, the controller is configured to control the switch units by alternating at least the first current path and the second current path, preferably for the same time.

Similarly, when a first negative voltage level higher than the voltage of the third negative input node 46, such as $-V_{DC}/4$ for the embodiment of FIG. 1, is required at the first output node 23, the controller is configured to control the switch units by alternating at least a third current path and a fourth current path, preferably for the same time.

In other embodiments there may be more than two redundant current paths which are adapted to output the same voltage.

For example, when the embodiment of FIG. 3 is considered, and the voltage $V_{DC}/6$ is required, there are three redundant current paths. A first current path comprises the third positive branch 41, the second positive capacitor 51, the second positive intermediate branch 34 and the first positive branch 21. A second current path comprises the third intermediate branch 42, the second positive capacitor 51, the switching group 331 of the second positive end branch 33 which is adjacent to the second positive capacitor 51, the second positive connecting capacitor 56, the switching group 342 of the second positive intermediate branch 34 which is adjacent to the first positive branch 21, and the positive branch 21. A third current path comprises the third intermediate branch 42, the switching group 341 of the second positive intermediate branch 34 which is adjacent to the second positive capacitor 51, the second positive connecting capacitor 56, the switching group 332 of the second positive end branch 33 which is adjacent to the first positive branch 21, and the positive branch 21.

It shall be noted that the charge and discharge process for the second positive capacitor 51 is inverted between the first and the second paths, and for the second positive connecting capacitor 56 it is inverted between the second and third paths. The three paths therefore can be alternated for keeping constant the voltages of the capacitors.

In general, when the second positive capacitor 51 is considered, the first current path comprises at least a switch unit of the third positive branch 41, which switch unit is adjacent to the second positive capacitor 51, the second positive capacitor 51, and a switch unit of the second positive intermediate branch 34 adjacent to the second positive capacitor 51. Moreover, the second current path comprises at least a switch unit of the third intermediate branch 42 adjacent to the second positive capacitor 51, the second positive capacitor 51, and a switch unit of the second positive end branch 33 adjacent to the second positive capacitor 51.

For keeping constant the voltage of the second negative capacitor 52, the third current path comprises at least a switch unit of the third negative branch 43 adjacent to the second negative capacitor 52, the second negative capacitor 52, and a switch unit of the second negative intermediate branch 35 adjacent to the second negative capacitor 52. The fourth current path comprises at least a switch unit of the third intermediate branch 42 adjacent to the second negative capacitor 52, the second negative capacitor 52, and a switch unit of the second negative end branch 36 adjacent to the second negative capacitor 52.

Of course, the first and second current paths shall both output the first positive voltage level, and the third and fourth current paths shall both output the first negative voltage level.

More in general, when any of the capacitors of the converter 1 is considered, the first current path comprises the capacitor, a switch unit upstream the capacitor and adjacent to the positive terminal thereof, and a switch unit downstream the capacitor and adjacent to the negative terminal thereof. The second current path comprises the capacitor, a switch unit upstream the capacitor and adjacent to the negative terminal thereof, and a switch unit downstream the capacitor and adjacent to the positive terminal thereof.

The invention claimed is:

1. An electric power converter comprising a plurality of branches, each branch comprising one or more series connected switch units, each switch unit comprising a controllable switch and a diode connected in antiparallel to the controllable switch, the converter comprising a first stage, a second stage and a third stage, the first, second and third stages being connected in series, wherein:

the first stage comprises a first positive branch connected between a first output node and a first positive input node, and a first negative branch connected between the first output node and a first negative input node, the second stage comprises:
a positive cell, the positive cell comprising a second positive end branch connected between the first positive input node and a second positive input node, and a second positive intermediate branch connected between the first positive input node and a second intermediate input node,
a negative cell, the negative cell comprising a second negative intermediate branch connected between the first negative input node and the second intermediate input node, and a second negative end branch connected between the first negative input node and a second negative input node,
a second positive capacitor connected between the second positive input node and the second intermediate input node, and a second negative capacitor connected between the second intermediate input node and the second negative input node, the third stage comprises:
a third positive branch connected between the second positive input node and a third positive input node,
a third intermediate branch connected between the second intermediate input node and a third intermediate input node,
a third negative branch connected between the second negative input node and a third negative input node,
a third positive capacitor connected between the third positive input node and the third intermediate input node, and a third negative capacitor connected between the third intermediate input node and the third negative input node.

2. A converter as claimed claim 1, wherein:
the third positive branch, the third negative branch and the third intermediate branch comprise each a plurality of switching groups, each switching group comprising one or more switch units, the switching groups being mutually connected in series in each respective branch at one or more third connecting nodes,
the third stage comprises one or more third positive connecting capacitors connected between respective third connecting nodes of the third positive branch and of the third intermediate branch, and one or more third negative connecting capacitors connected between respective third connecting nodes of the third intermediate branch and of the third negative branch.

3. A converter as claimed claim 1, wherein:
the second positive end branch, the second positive intermediate branch, the second negative intermediate branch and the second negative end branch comprise each a plurality of switching groups, each switching group comprising one or more switch units, the switching groups being mutually connected in series in each respective branch at one or more second connecting nodes,
the second stage comprises one or more second positive connecting capacitors connected between respective second connecting nodes of the second positive end branch and of the second positive intermediate branch, and one or more second negative connecting capacitors connected between respective second connecting nodes of the second negative intermediate branch and of the second negative end branch.

4. A converter as claimed in claim 1, wherein:
the first positive branch and the first negative branch comprise each a plurality of switching groups, each switching group comprising one or more switch units, the switching groups being mutually connected in series in each respective branch at one or more first connecting nodes,
the first stage comprises one or more first connecting capacitors connected between respective first connecting nodes of the first positive branch and of the first negative branch.

5. A converter as claimed in claim 1, wherein the third positive and negative capacitors are charged to a first voltage, and the second positive and negative capacitors are charged to a second voltage which is a fraction of the first voltage.

6. A converter as claimed in claim 1, wherein the third intermediate branch comprises a first switch unit adapted to stop a current flowing in a first direction and a second switch unit adapted to stop a current flowing in a second direction opposite to the first direction.

7. A converter as claimed in claim 6, wherein the third positive and negative branches comprise each a first switch unit and a second switch unit, wherein the first and second switch units of the third positive, negative and intermediate branches have all the same blocking voltage.

8. A converter as claimed in claim 1, comprising a controller, wherein the converter is controllable by the controller to provide an output voltage at the first output node, the output voltage having positive halfwaves and negative halfwaves alternating at a fundamental frequency.

9. A converter as claimed in claim 8, wherein:
the controller is configured to control a switch unit of the second positive end branch and a switch unit of the second positive intermediate branch to be always in opposite states, and to control a switch unit of the second negative intermediate branch and a switch unit of the second negative end branch to be always in opposite states,
the controller is configured, during the positive halfwave, to keep said switch unit of the second negative intermediate branch in an on state and to switch said switch unit of the second positive intermediate branch at a switching frequency which is a multiple of the fundamental frequency,
the controller is configured, during the negative halfwave, to keep said switch unit of the second positive intermediate branch in an on state and to switch said switch unit of the second negative intermediate branch at the switching frequency.

10. A converter as claimed in claim 6, wherein:
the controller is configured to control the first switch unit of the third intermediate branch and the first switch unit of the third positive branch to be always in opposite states, and to control the second switch unit of the third intermediate branch and the first switch unit of the third negative branch to be always in opposite states,
the controller is configured, during the positive halfwave, to keep the second switch unit of the third intermediate branch in an on state and to switch the first switch unit of the third intermediate branch at a switching frequency which is a multiple of the fundamental frequency,
the controller is configured, during the negative halfwave, to keep the first switch unit of the third intermediate branch in an on state and to switch the second switch unit of the third intermediate branch at the switching frequency.

11. A converter as claimed in claim 7, wherein the controller is configured to control the second switch units of the third positive and negative branches to be always in opposite states.

12. A converter as claimed in claim 11, wherein the controller is configured to keep the second switch unit of the third positive branch in an on state during the positive halfwave, and to keep the second switch unit of the third negative branch in an on state during the negative halfwave.

13. A converter as claimed in claim 7, wherein the controller is configured to control the first and the second switch units of the third positive branch to be always in the same state, and to control the first and the second switch units of the third negative branch to be always in the same state.

14. A converter as claimed in claim 8, wherein:
the controller is configured to control a switch unit of the first positive branch and a switch unit of the first negative branch to be always in opposite states, and
the controller is configured to keep said switch unit of the first positive branch in an on state during the positive halfwave, and to keep said switch unit of the first negative branch in an on state during the negative halfwave.

15. A converter as claimed in claim 8, wherein:
the controller is configured, during the transition from the positive to the negative halfwaves, to keep in an on state the second positive intermediate branch and the second negative intermediate branch, and to switch the first positive branch from an on state to an off state, and
the controller is configured, during the transition from the negative to the positive halfwaves, to keep in an on state the second positive intermediate branch and the second negative intermediate branch, and to switch the first negative branch from an on state to an off state.

16. A converter as claimed in claim 8, wherein:
when a first positive voltage level is required at the first output node, the first positive voltage level being lower than the voltage of the third positive input node, the controller is configured to control the switch units by alternating at least a first and a second current path comprising capacitors and switch units in the on state,
when a first negative voltage level is required at the first output node, the first negative voltage level being higher than the voltage of the third negative input node, the controller is configured to control the switch units by alternating at least a third and a fourth current path comprising capacitors and switch units in the on state,
the first current path comprises at least a switch unit of the third positive branch adjacent to the second positive capacitor, the second positive capacitor, and a switch unit of the second positive intermediate branch adjacent to the second positive capacitor,
the second current path comprises at least a switch unit of the third intermediate branch adjacent to the second positive capacitor, the second positive capacitor, and a switch unit of the second positive end branch adjacent to the second positive capacitor,
the third current path comprises at least a switch unit of the third negative branch adjacent to the second negative capacitor, the second negative capacitor, and a switch unit of the second negative intermediate branch adjacent to the second negative capacitor, the fourth current path comprises at least a switch unit of the third intermediate branch adjacent to the second negative capacitor, the second negative capacitor, and a switch unit of the second negative end branch adjacent to the second negative capacitor.

* * * * *